United States Patent [19]
McCallan

[11] Patent Number: 5,844,908
[45] Date of Patent: Dec. 1, 1998

[54] DIGITAL DELAY SYSTEM AND METHOD FOR DIGITAL CROSS CONNECT TELECOMMUNICATION SYSTEMS

[75] Inventor: Christopher B. McCallan, Plano, Tex.

[73] Assignee: Alcatel Network Systems, Inc., Richardson, Tex.

[21] Appl. No.: 749,933

[22] Filed: Nov. 14, 1996

[51] Int. Cl.$^6$ .................................................... H04L 7/02
[52] U.S. Cl. ........................................... 370/518; 375/371
[58] Field of Search ..................................... 370/503, 506, 370/516, 517, 518, 532, 533; 375/359, 360, 371, 373, 375, 376; 327/144, 238

[56] References Cited

U.S. PATENT DOCUMENTS

| | | | |
|---|---|---|---|
| 4,841,551 | 6/1989 | Avaneas ................................. | 375/371 |
| 4,931,986 | 6/1990 | Daniel et al. ........................... | 375/371 |
| 5,022,056 | 6/1991 | Henderson et al. .................... | 370/517 |
| 5,442,664 | 8/1995 | Rust et al. .............................. | 375/371 |

*Primary Examiner*—Chau Nguyen
*Attorney, Agent, or Firm*—Gray Cary Ware & Freidenrich, LLP

[57] ABSTRACT

A system and method for provides a generating a plurality of clock phases from a clock signal in a telecommunications cross connect system. The digital delay circuit includes a plurality of delay elements connected in series, each delay element connected to a sampling element, the output of the sampling elements sent to a multiplexor. The total number of delay elements comprises a number that produces a worst case delay equal to or greater than the period of the clock signal. The delay elements receive the rising edge of the clock signal. The delayed rising edges are sent to the sampling elements. The sampling elements send outputs to the multiplexor for determining the number of delay elements transitions by one cycle of the clock signal. A programming device can be coupled to the multiplexor to request from the multiplexor a particular phase of the clock signal. The multiplexor can select the appropriate delay device to generate the particular phase of the clock signal.

20 Claims, 2 Drawing Sheets

5,844,908

DIGITAL DELAY SYSTEM AND METHOD FOR DIGITAL CROSS CONNECT TELECOMMUNICATION SYSTEMS

TECHNICAL FIELD OF THE INVENTION

The present invention relates generally to telecommunications systems and methods, and more particularly, to a digital system and method for introducing a delay into a cross connect system in order to generate a particular phase of a clock signal.

BACKGROUND OF THE INVENTION

In telecommunications systems, moving data across an interface in a step fashion, according to a clock synchronization scheme, can require constructing different phases of a given clock signal. In particular, a problem arises when trying to create a four phase clock from a single phase clock running at a relatively high frequency (for example, approximately 50 MHZ).

Conventional cross connect systems typically use a clock recovery method that involves connecting an external analog delay line into the system to recover data that passes through the switching matrix. The analog delay line is an RC network which delays the clock signal. The pins of the chip are connected to the individual taps of the delay line to recover a particular clock phase.

These conventional external analog delay lines prove various phases of the clock using expensive, bulky and highly accurate components which are specific (unique) to the particular frequency to be delayed. Furthermore, the external analog delay lines are expensive and difficult to manufacture. In addition to the expense of the analog delay lines themselves, using analog delay lines increases the overall system manufacturing cost. Manufacturing this conventional solution requires putting down an analog delay line, soldering the part, and performing a functional verification. Generally, functional verification cannot be performed automatically, but rather must be done using more expensive manual testing.

Furthermore, these external analog delay lines are subject to analog constraints. Analog circuitry incorporates inherent inaccuracies in the devices and circuits. In the cross connect system application, the additional pins needed to get multiple taps of the delay line into the chip increases the power that must be dissipated by the package, which increases cost. Furthermore, these external analog delay lines are not typically temperature or voltage compensated. Depending on the circuit parasitics, the actual delay taps will vary simply by virtue of the fact that they were connected to the chip. These constraints can lead to inoperative and spurious operation of the clock recovery circuit.

SUMMARY OF THE INVENTION

The present invention provides a digital delay system and method for a digital cross connect system that substantially eliminates or reduces disadvantages and problems associated with previously developed delay line systems and methods.

More specifically, the present invention provides a system and method for generating a plurality of clock phases from a clock signal in a telecommunications cross connect system. The digital delay circuit of the present invention includes a plurality of delay elements, a plurality of sampling elements, and a multiplexor. The total number of delay elements comprises a number that produces a worst case delay equal to or greater than the period of the clock signal. The delay elements receive the rising edge of the clock signal. The delayed rising edges are sent to the sampling elements. The sampling elements send outputs to the multiplexor to determine the number of delay elements transitioned by one cycle of the clock signal.

In a further aspect of the present invention, a programming device is coupled to the multiplexor to request from the multiplexor a particular phase of the clock signal. The programming device can receive a request for a particular phase of the clock signal to be generated, divide the number of delay devices transitioned by the binary number representing the requested phase to determine an appropriate delay device at which that phase exists, and instruct the multiplexor to select the appropriate delay device so that the multiplexor generates the requested phase.

The present invention provides an important technical advantage by eliminating the analog delay lines currently used to generate a particular phase of a given clock.

The present invention provides another technical advantage by reducing the cost, complexity, and inaccuracies associated with analog delay lines used in conventional digital cross connect systems to generate a particular phase of a clock.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the FIGURES, like numerals being used to refer to like and corresponding parts of the various drawings.

Conventional digital cross connect systems use a clock recovery method that depends on incorporating an analog phase locked loop to recover the clock signal from data passed through the switching matrix. The present invention provides a digital delay line used by a digital phase locked loop that replaces these analog delay lines used by the analog phase locked loop. The present invention delays the original clock signal to provide different phases using a string of delay elements. The delay circuit of the present invention is sampled by the clock signal once and used as a reference measure of how many delay elements were transitioned in one period of the clock. The different phases can then be fed into a multiplexer which selects the desired phase suitable for retiming received data.

Figure 1:
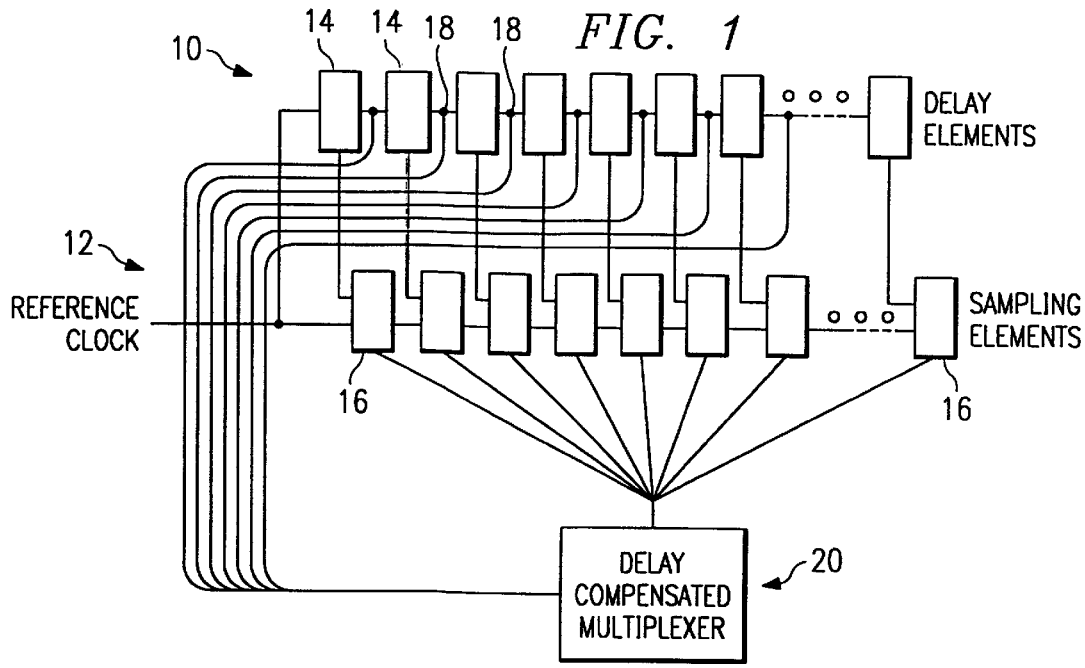
FIG. 1 shows one embodiment of the present invention consisting of a set of delay elements, a set of taps, a set of sampling elements, and a delay compensated multiplexor.

As shown in FIG. 1, one embodiment of the digital delay circuit 10 of the present invention consists of a characterized tapped delay line 12 comprising a set of delay elements 14, a set of taps 18, and a set of sampling elements 16. The tapped delay line 12 connects to a multiplexer 20 from taps 18 (each tap 18 connected to a delay element 14) and from sampling elements 16. The multiplexor 20 can be a delay compensated multiplexor and is a phase selector.

In one embodiment, a string of AND gates are connected in series as the delay elements 14. The number of delay elements 14 (in this case AND gates) must produce a worst case delay in the delay string that at least equals or exceeds the period of the clock. In other words, the present invention requires, at a minimum, at least enough delay elements 14 so that the total delay through the delay elements 14 equals or exceeds the period of the clock signal. Thus, the delay element 14 needs to have known maximum delay parameters over temperature, process and voltage. The number of delay elements 14 needed to create a derived clock with an arbitrary phase relative to the reference clock is:

$$N = \frac{1}{(f*D)}$$

The actual sampling element 16 which represents a desired phase is:

$$S = N \cdot \frac{\Phi}{2\pi}$$

Where
N is the number of delay elements needed to cover a full clock period
f is the frequency of the clock to be delayed
D is the worst case delay of a single element
$\Phi$ is the desired phase of the derived clock.

For example, if 200 gates equals the number of delay elements in one period of the clock, and a 90 degree phase is desired, then:

$$\begin{aligned} S &= N \cdot \frac{90°}{2\pi} \\ &= N \cdot \frac{90}{360} \\ &= 200 \cdot \frac{1}{4} \\ S &= 100 \end{aligned}$$

Figure 2:
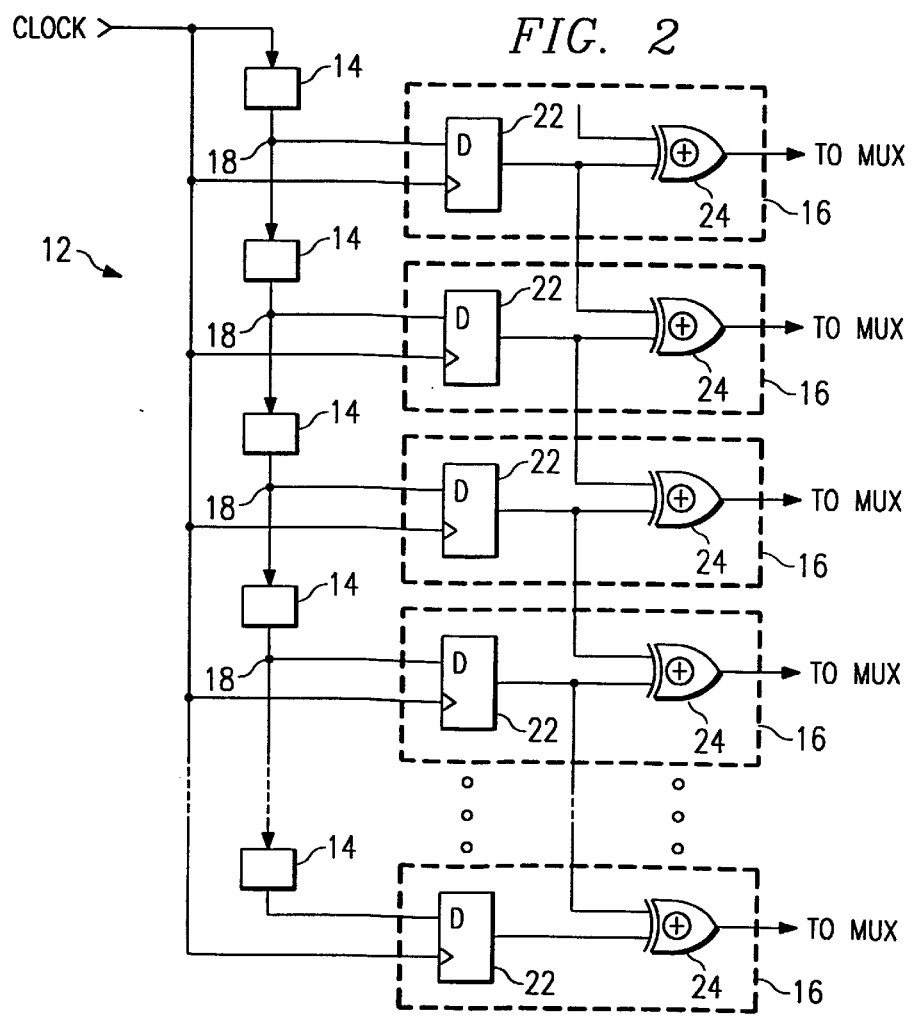
FIG. 2 shows a detailed view of one embodiment of a sampling element of FIG. 1.

FIG. 2 shows one embodiment of the delay line 12 where the delay elements 14 comprise AND gates 14 and each sampling element 16 consists of a flip-flop 22 and an exclusive OR gate 24. The flip-flops 22 should preferably be non-latching (i.e., with no transmission gates in the flip-flop) to minimize metastability. As shown in FIG. 2, the clock signal enters each AND gate 14 and the output from the Nth AND gate 14 goes as an input to the Nth flip flop 22. The clock signal also enters the flip flop 22 directly so that the flip flop 22 will contain both clock and data. The Nth exclusive OR gate 24 receives the output of the Nth flip flop 22 and the output of the (N−1)th flip-flop 22 as shown in FIG. 2. The first exclusive OR gate represents an exception to this formula because the first exclusive OR gate 24 receives the output of the 1st flip flop 22 and the clock signal directly (rather than from the previous flip flop). The output from each exclusive OR gate 24 is sent to the multiplexor 20.

The digital delay line circuit 10 of the present invention can use the sampling elements 16 to determine the number of AND gates 14 transitioned by one cycle of the clock signal. The circuit is initialized by "clearing" the sampling elements first. In order to determine the delay line tap 18 connected to the delay element 16 that represents a full cycle of the clock signal through the AND gates 14, the rising edge of the reference clock is injected into the delay line 12. This rising edge is used to sample each delay element 14 output simultaneously. Once injected into the delay line 12, the rising edge of the reference clock will progress through a number of delay elements 14 before the second rising edge of the reference clock occurs. After the second rising edge of the reference clock occurs, the flip flops 22 contain an image of the number of AND gate delay elements 14 through which the reference clock progressed. This process is continuously repeated to update the number of delay elements 14 transitioned by a single clock.

Once the number of delay elements 14 transitioned during a single cycle of the clock signal is determined, simple division will define the delay element transitioned for any particular phase of the clock. Any programming device, such as a microprocessor or hardware contained within the multiplexor, can perform this division. For example, if four hundred delay devices represent the number of delay devices transitioned in a single clock phase, a phase of 90 degrees corresponds to dividing the number of delay elements transitioned (400) by four and selecting the signal from the tap 18 associated with the 400/4=100th delay device. In this way, any phase of the reference clock can be sampled from the appropriate delay element 14. The continuous updating of the number of delay elements 14 transitioned by a single clock automatically compensates for temperature or voltage fluctuations in the circuit.

Figure 3:
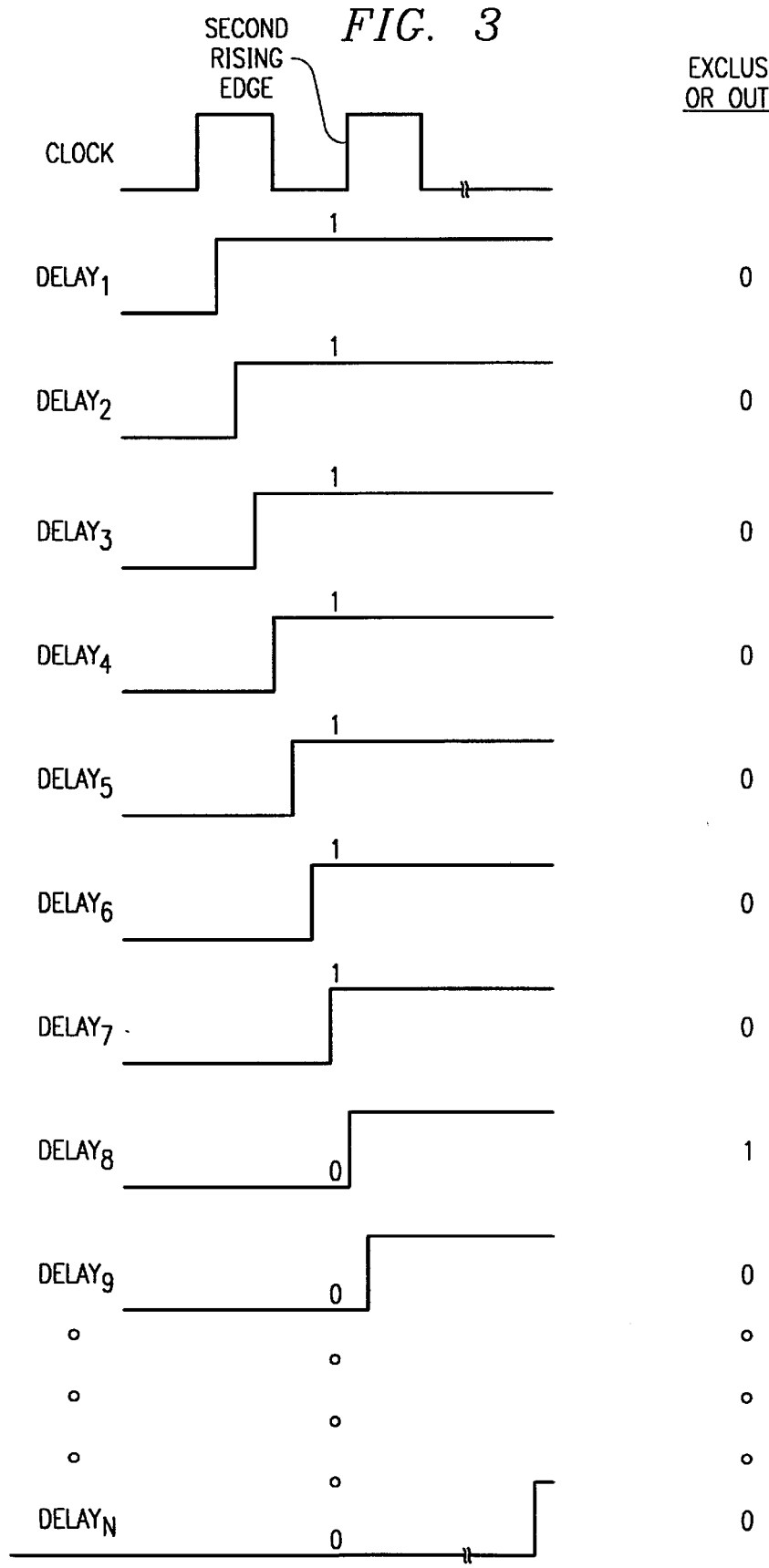
FIG. 3 is a timing diagram showing the clock signal as delayed through each delay device and the resulting output from an exclusive OR device.

FIG. 3 shows a timing diagram (illustrative only) that illustrates how to determine which tap 18 associates with the delay element 14 that coincides with completion of one cycle of the clock signal. The rising edge of the clock signal is injected through the delay line 12 and delayed at each delay element 14. The signal labeled "DELAY$_1$" represents the rising edge of the clock signal delayed for some amount of time through the first delay element 14. The DELAY$_1$ signal is high (a logic "1") at the second rising edge of the clock signal. Each successive signal represents the rising edge delayed some additional time through additional delay elements 14. The delayed clock signal labeled DELAY$_8$ represents the first signal delayed for a sufficient time that the delayed clock signal is low (a logic "0") at the second rising edge of the clock signal. Each subsequent DELAY signal is also low at the second rising edge of the clock signal, as shown in FIG. 3, due to the "clearing" operation previously mentioned as a pre-condition for proper circuit operation.

The output of the Nth exclusive OR 24 depends on the input from the Nth flip flop 22 and the (N−1)th flip flop 22. With reference to FIG. 3, the input to the second exclusive OR 24 is the input from the second flip flop 22, or the DELAY$_2$ signal, and the first flip flop 22, or DELAY$_1$ signal. Both DELAY$_1$ and DELAY$_2$ are high, thus the output of the second exclusive OR will be low (a logic "0"). The input to the eight exclusive OR 24 will be DELAY$_8$, a logic "0" and DELAY$_7$ a logic "1", resulting in a logic "1" output from the eighth exclusive OR 24. Each successive exclusive OR will see two logic "1" signal, resulting in a logic "0" output. Thus, the output from the exclusive OR's 24 that saw the first clock edge will be a logic "0" and the first logic "1" output represents the delay element 14 at which a full clock cycle has occurred.

The first logic "1" output is then encoded as the number of delay elements 14 transitioned during the period of the reference clock signal. Using this number, any phase shift of the clock signal can be sampled. For example, if the number of AND gates transitioned by one clock cycle is 20, then a 180 degree phase shift divides the number of gates by two, resulting in 10 gates. Therefore, sampling the tenth AND gate delay element 14 (through its associated tap 18) provides a 180 degree phase shift of the original clock. Likewise, dividing the number of delay elements transitioned by 4 represents a 90 degree phase shift, dividing by 12 represents a 30 degree phase shift, and so forth. Thus, any phase shift of the original clock signal can be sampled once the number of delay elements 14 transitioned during one clock cycle is determined.

The outputs of the exclusive ORs 24 used to determine the number of delay elements 14 transitioned in a single cycle of the clock are sent to the multiplexor 20 in order to extract the appropriate phase of the reference clock. Once the number of delay elements 14 has been determined, the multiplexor 20 can be programmed, for example, via hardware or a microprocessor, to sample the signal from the tap 18 associated with the delay element 14 that corresponds to the appropriate phase of the clock signal. The multiplexor should be constructed such that the worst case skew due to the taps 18 between the inputs and the output are less than or equal to the worst case delay of a single delay element 14, and further such that the delay between each tap 18 is approximately equal. This is necessary since the multiplexor 20 receives continuous updates to maintain the same phase relationship to the reference clock as the chip voltage and temperature vary. If the delay time between each tap 18 was not approximately equal, then a switch from delay element (N−1) to delay element (N) that would theoretically produce a clock whose phase lagged the phase of element (N−1), could actually produce a clock whose phase led that of element (N−−1).

As described, the digital delay line circuit 10 of the present invention will generate a plurality of clock phases from a single reference clock. The implementing circuitry described herein is by way of illustration and it should be understood that various other circuits could produce a similar result. The present invention can be coupled with existing circuits to produce a completely self-contained digital clock recovery system. This digital delay capability will decrease manufacturing costs by eliminated the requirement for analog delay lines. Furthermore, the present invention provides a continuously updating delay line circuit 10 that will compensate for temperature and voltage variations in a telecommunications cross-connect system.

In summary, the present invention provides a system and method for provides a generating a plurality of clock phases from a clock signal in a telecommunications cross connect system. The digital delay circuit includes a plurality of delay elements, a plurality of sampling elements, and a multiplexor. The total number of delay elements comprises a number that produces a worst case delay equal to or greater than the period of the clock signal. The delay elements receive the rising edge of the clock signal. The delayed rising edges and the clock signal are sent to the sampling elements. The sampling elements send outputs to the multiplexor used to determine the number of delay elements transitions by one cycle of the clock signal. A programming device can be coupled to the multiplexor to request from the multiplexor a particular phase of the clock signal. The multiplexor can select the appropriate delay device to generate the particular phase of the clock signal.

Although the present invention has been described in detail, it should be understood that various changes, substitutions and alterations can be made hereto without departing from the spirit and scope of the invention as described by the appended claims.

What is claimed is:

1. A digital delay circuit in a digital cross connect telecommunications system for generating a plurality of clock phases from a clock signal, the digital delay circuit comprising:

a plurality of delay elements connected in series operable to receive a rising edge of the clock signal, the total number of delay elements comprising a number that produces a worst case delay equal to or greater than the period of the clock signal;

a plurality of sampling elements connected in series operable to receive the clock signal, each sampling element further connected to a delay element and further operable to sample that delay element;

a multiplexor connected to each sampling element and operable to receive and compare the output of each sampling element to determine the number of delay elements transitions by one cycle of the clock signal; and a programming device coupled to the multiplexor and operable to receive a request for a particular phase of the clock signal to be generated, divide the number of delay devices transitioned by the binary number representing the requested phase to determine an appropriate delay device at which that phase exists, and instruct the multiplexor to select the appropriate delay device so that the multiplexor generates the requested phase.

2. The digital delay circuit of claim 1, further comprising a plurality of taps, each tap connected to an associated delay element, each tap further connected to the multiplexor such that the multiplexor can select a particular delay device output via the particular delay element's associated tap to generate a particular phase clock from the clock signal.

3. The digital delay circuit of claim 1, wherein the plurality of delay elements comprise a plurality of AND gates and the plurality of sampling devices comprise:

a plurality of flip flop devices, each flip flop connected to a delay device and operable to receive the rising edge of the clock signal as an output from the connected delay device and further operable to receive the clock signal; and a plurality of exclusive OR devices, each exclusive OR device connected to a flip flop and operable to receive the output of the connected flip flop and further operable to receive the output of the previous flip flop, except that the first exclusive OR device receives the output from the first flip flop and the clock signal.

4. The digital delay circuit of claim 3, wherein the plurality of flips flops are of the non-latching type.

5. The digital delay circuit of claim 1, wherein the plurality of delay elements comprise a plurality of AND gates and the plurality of sampling devices comprise:

a plurality of flip flop devices, each flip flop connected to a delay device and operable to receive the rising edge of the clock signal as an output from the connected delay device and further operable to receive the clock signal; and a plurality of exclusive OR devices, each exclusive OR device connected to a flip flop such that the nth exclusive OR device receives the output of the nth flip flop and the (n−1)th flip flop, except where the first exclusive OR device receives the clock signal and the output from the first flip flop.

6. The digital delay circuit of claim 1, wherein the number of delay elements is defined by the formula:

$$S = N \cdot \frac{\Phi}{2\pi}$$

where N is the number of delay elements for a full clock period as defined by $$N = \frac{1}{(f*D)},$$

f is the frequency of the clock to be delayed, D is the worst case delay of an element, and $\Phi$ is the phase of the clock to be generated.

7. The digital delay circuit of claim 1, wherein the sampling elements continuously sample the delay elements.

8. The digital delay circuit of claim 1, wherein the multiplexor is a delay compensated multiplexor.

9. A digital delay circuit for use in a digital cross connect telecommunications system using a clock signal, comprising:
- a plurality of delay elements connected in series operable to receive a rising edge of the clock signal, the total number of delay elements comprising a number that produces a worst case delay equal to or greater than the period of the clock signal;
- a plurality of sampling elements connected in series operable to receive the clock signal, each sampling element further connected to a delay element and further operable to sample that delay element; and
- a multiplexor connected to each sampling element and operable to receive and compare the output of each sampling element to determine the number of delay elements transitions by one cycle of the clock signal.

10. The digital delay circuit of claim 9, further comprising a programming device that receives a request for a particular phase of the clock signal to be generated, divides the number of delay devices transitioned by the binary number representing the requested phase to determine an appropriate delay device at which that phase exists, and instructs the multiplexor to select the appropriate delay device so that the multiplexor generates the requested phase.

11. The digital delay circuit of claim 9, further comprising a plurality of taps, each tap connected in series to an associated delay element and each tap further connected to the multiplexor such that the multiplexor can select a particular delay device output via the tap associated with the particular delay element to generate a particular phase clock from the clock signal.

12. The digital delay circuit of claim 9, wherein the plurality of delay elements comprise a plurality of AND gates and the plurality of sampling devices comprise:
- a plurality of flip flop devices, each flip flop connected to a delay device and operable to receive the rising edge of the clock signal as an output from the connected delay device and further operable to receive the clock signal; and
- a plurality of exclusive OR devices, each exclusive OR device connected to a flip flop and operable to receive the output of the connected flip flop and further operable to receive the output of the previous flip flop, except that the first exclusive OR device receives the output from the first flip flop and the clock signal.

13. The digital delay circuit of claim 12, wherein the plurality of flips flops are of the non-latching type.

14. The digital delay circuit of claim 9, wherein the plurality of delay elements comprise a plurality of AND gates and the plurality of sampling devices comprise:
- a plurality of flip flop devices, each flip flop connected to a delay device and operable to receive the rising edge of the clock signal as an output from the connected delay device and further operable to receive the clock signal; and
- a plurality of exclusive OR devices, each exclusive OR device connected to a flip flop such that the nth exclusive OR device receives the output of the nth flip flop and the (n−1)th flip flop, except where the first exclusive OR device receives the clock signal and the output from the first flip flop.

15. The digital delay circuit of claim 9, wherein the number of delay elements is defined by the formula:

$$S = N \cdot \frac{\Phi}{2\pi}$$

where N is the number of delay elements for a full clock period as defined by $$N = \frac{1}{(f*D)},$$

f is the frequency of the clock to be delayed, D is the worst case delay of an element, and $\Phi$ is the phase of the clock to be generated.

16. The digital delay circuit of claim 9, wherein the sampling elements continuously sample the delay elements.

17. A method for generating a plurality of requested clock phases from a single clock signal in a digital cross connect telecommunications system using a digital delay circuit, the method comprising:
- injecting the rising edge of the clock signal into a plurality of delay elements connected in series such that the delay elements produce a worst case delay equal to or greater than the period of the clock signal;
- injecting the clock signal into a plurality of sampling elements connected in series;
- sending the output of each delay element to an associated sampling element;
- sending the output of the plurality of sampling elements to a multiplexor;
- determining from the output of the plurality of sampling elements the number of delay elements transitioned by one cycle of the clock signal;
- requesting a particular phase of the clock signal;
- dividing the number of delay elements by a binary number representing the phase of the requested clock signal to determine the appropriate delay device from which to retrieve the requested phase;
- selecting the appropriate delay device with the multiplexor to generate the requested clock phase as an output from the multiplexor.

18. The method of claim 17, further comprising connecting a tap to the output of each delay element and further connected each tap to the multiplexor such that the multiplexor can select a particular delay element to generate a particular phase clock from the clock signal.

19. The method of claim 17, further comprising:
- injecting the rising edge of the clock signal into a plurality of AND gates; and
- injecting the clock signal into a plurality of flip flop devices, where each flip flop is connected to an AND gate device and also receives the rising edge of the clock signal as an output from the connected AND gate; and
- connecting a plurality of exclusive OR devices to the plurality of flip flop devices such that the output of the (n)th flip flop and the (n−1)th flip flop is sent to the nth exclusive OR device, except that the first exclusive OR device receives the clock signal and the output from the first flip flop.

20. The method of claim 17, further comprising continuously sampling the delay elements to continuously determine the number of delay elements transitioned by one cycle of the clock signal, thereby compensating for temperature and voltage variations.

* * * * *